(12) United States Patent
Okano et al.

(10) Patent No.: US 12,304,480 B2
(45) Date of Patent: May 20, 2025

(54) VEHICLE DRIVE ASSIST APPARATUS

(71) Applicant: SUBARU CORPORATION, Tokyo (JP)

(72) Inventors: Masashi Okano, Tokyo (JP); Kazuki Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 277 days.

(21) Appl. No.: 17/866,916

(22) Filed: Jul. 18, 2022

(65) Prior Publication Data

US 2023/0031839 A1 Feb. 2, 2023

(30) Foreign Application Priority Data

Jul. 28, 2021 (JP) ................................. 2021-123449

(51) Int. Cl.
*B60W 30/12* (2020.01)
*B60W 10/20* (2006.01)
*B60W 40/04* (2006.01)
*B62D 15/02* (2006.01)

(52) U.S. Cl.
CPC ............ *B60W 30/12* (2013.01); *B60W 10/20* (2013.01); *B60W 40/04* (2013.01); *B62D 15/021* (2013.01); *B62D 15/025* (2013.01); *B60W 2420/403* (2013.01); *B60W 2420/408* (2024.01); *B60W 2510/202* (2013.01); *B60W 2540/18* (2013.01); *B60W 2710/202* (2013.01); *B60W 2710/207* (2013.01)

(58) Field of Classification Search
CPC .............................. B60W 30/12; B62D 15/025
See application file for complete search history.

(56) References Cited

U.S. PATENT DOCUMENTS

2012/0203431 A1* 8/2012 Kojo ...................... B62D 5/008
 701/41
2012/0283912 A1* 11/2012 Lee ........................ B62D 1/286
 701/41

(Continued)

FOREIGN PATENT DOCUMENTS

| JP | 11-91606 A | | 4/1999 |
|---|---|---|---|
| JP | 2000198458 A | * | 7/2000 |
| JP | 2010-036852 A | | 2/2010 |

*Primary Examiner* — Christian Chace
*Assistant Examiner* — Shayne M. Gilbertson
(74) *Attorney, Agent, or Firm* — Rimon P.C.

(57) ABSTRACT

Surrounding situation information of a vehicle is acquired. A steering torque applied by using a steering mechanism of the vehicle is detected. A steering angle and a steering direction of the vehicle are detected. Traveling control involving steering assist control is executed based on those pieces of information. In a case where a steering torque amount or the steering angle is detected, a new target lane keeping traveling path or a predetermined target lane departure prevention traveling path of the vehicle is created based on the steering torque amount, the steering angle, and the steering direction of the vehicle. In a case where the steering torque amount or the steering angle is detected again within a predetermined period, the new target lane keeping traveling path or the predetermined target lane departure prevention traveling path is set and traveling control is executed along the set traveling path.

9 Claims, 6 Drawing Sheets

(56) References Cited

U.S. PATENT DOCUMENTS

| | | | |
|---|---|---|---|
| 2015/0094915 A1* | 4/2015 | Oyama | B60W 30/12 |
| | | | 701/42 |
| 2015/0134218 A1* | 5/2015 | Ishida | B60T 7/12 |
| | | | 701/1 |
| 2016/0107687 A1* | 4/2016 | Yamaoka | B62D 15/025 |
| | | | 701/41 |
| 2017/0088166 A1* | 3/2017 | Kunihiro | B62D 6/002 |
| 2017/0349212 A1* | 12/2017 | Oshida | G01L 5/221 |
| 2018/0170370 A1* | 6/2018 | Kataoka | B60W 30/09 |
| 2018/0201318 A1* | 7/2018 | Kataoka | G06V 20/588 |
| 2019/0092321 A1* | 3/2019 | Shimizu | B60W 40/08 |
| 2020/0031344 A1* | 1/2020 | Okano | B62D 1/286 |
| 2020/0255012 A1* | 8/2020 | Sato | B60W 30/16 |
| 2021/0380112 A1* | 12/2021 | Oh | B60W 30/0956 |
| 2022/0126851 A1* | 4/2022 | Lu | B60W 50/16 |
| 2022/0314977 A1* | 10/2022 | Yasui | B60W 10/18 |

\* cited by examiner

VEHICLE DRIVE ASSIST APPARATUS

CROSS-REFERENCE TO RELATED APPLICATIONS

The present application claims priority from Japanese Patent Application No. 2021-123449 filed on Jul. 28, 2021, the entire contents of which are hereby incorporated by reference.

BACKGROUND

The disclosure relates to a vehicle drive assist apparatus that assists a driving operation of a driver by lane keeping traveling control and lane departure prevention control.

In the field of vehicles such as automobiles, autonomous driving control technologies have been developed to cause the vehicles to autonomously travel without driving operations of drivers. Various drive assist apparatuses using the autonomous driving control technologies have been proposed and put into practical use to perform various types of control for assisting driving operations of drivers.

Examples of related-art drive assist apparatuses include a drive assist apparatus having an active lane keeping (ALK) traveling control function. In this drive assist apparatus, the vehicle continues to travel along a traveling lane based on various types of acquired information data while constantly recognizing situations around the vehicle by using various sensor devices and other devices.

Examples of the related-art drive assist apparatuses also include a drive assist apparatus having a lane departure prevention (LDP) control function. This drive assist apparatus performs predetermined steering assist control as appropriate when determination is made that the vehicle is likely to depart from the traveling lane, thereby avoiding or suppressing the departure of the vehicle from the traveling lane.

Various obstacles are present in ordinary vehicular roads having no median strip at the center as a three-dimensional structure. Examples of the obstacles include three-dimensional structures typified by curbstones, guardrails, side walls (including a snow wall on a snowy road), and utility poles at a boundary between a roadway and a sidewalk, other vehicles parked or stopped in side areas of the road (road shoulders), other vehicles stopped in a right or left area of a traveling lane of the vehicle behind an intersection to turn right or left, and road cones for lane closure under roadwork or for bordering with the construction area.

The obstacles described above are referred to collectively as "avoidance targets". The avoidance target may hinder the traveling of the vehicle, and therefore collision between the vehicle and the avoidance target is avoided. In the ordinary roads described above, the area where the vehicle can travel is limited by the avoidance targets.

In order that the vehicle including the related-art drive assist apparatus can continue to travel along the road safely while performing the lane keeping traveling control and the lane departure prevention control, the area where the vehicle can travel is constantly grasped by recognizing situations around the vehicle (for example, situations including obstacles on the road).

When controlling the traveling of the vehicle in the ordinary road having no three-dimensional structure such as a median strip, the vehicle drive assist apparatus recognizes a surrounding situation including other vehicles traveling, parked, or stopped in an oncoming lane (hereinafter referred to collectively as "vehicles in oncoming lane").

In a case where the vehicle is traveling along, for example, an ordinary road having no three-dimensional structure such as a median strip and an avoidance target such as a vehicle on an oncoming lane (hereinafter referred to as "oncoming vehicle") or a side wall is present, the driver may feel pressure from the avoidance target along with a decrease in a lateral distance between the avoidance target and the vehicle. The driver aware of the avoidance target may drive the vehicle along a position where the vehicle keeps distance from the avoidance target in the lateral direction. At this time, the driver may steer the vehicle away from the avoidance target. When actually driving the vehicle along a road, some drivers are likely to drive the vehicle near a road shoulder rather than along the center of a traveling lane irrespective of whether another vehicle is present in an oncoming lane.

During normal lane keeping control, the related-art vehicle drive assist apparatus controls the vehicle to travel along a traveling path set at the substantial center of the traveling lane (target lane keeping traveling path). When the driver is aware of the avoidance target such as an oncoming vehicle or a side wall and steers the vehicle away from the avoidance target with intention to keep distance from the avoidance target, the vehicle may depart from the set target lane keeping traveling path. In this case, the drive assist apparatus may activate traveling control so that the vehicle departing from the target lane keeping traveling path is returned to this traveling path, that is, may activate either one of the lane keeping control and the lane departure prevention control.

At this time, the driver steers the vehicle with intention to change the traveling path while being aware of the avoidance target. Therefore, the behavior of the vehicle caused by either one of the lane keeping control and the lane departure prevention control that may be activated in response to the driver's intended steering is unintended behavior for the driver. Thus, the driver may feel discomfort.

For example, Japanese Unexamined Patent Application Publication (JP-A) Nos. 2010-36852 and H11-91606 disclose various related-art drive assist apparatuses relating to technologies for switching to traveling control in consideration of driver's intention when a steering input intended by the driver is detected during either one of the lane keeping traveling control and the lane departure prevention control.

In the drive assist apparatus disclosed in JP-A No. 2010-36852, when the driver steers the vehicle with intention to, for example, change lanes and the detected steering is input in a direction toward lane departure while the vehicle is traveling by either one of the lane keeping traveling control and the lane departure prevention control, the driver's intended steering is given priority by suppressing the lane departure prevention control. Thus, inappropriate one of the lane keeping traveling control and the lane departure prevention control is suppressed during the lane change.

In the drive assist apparatus disclosed in JP-A No. H11-91606, when behavior toward, for example, lane departure is detected while the vehicle is traveling by either one of the lane keeping traveling control and the lane departure prevention control, the drive assist apparatus generates a steering torque for returning the vehicle to the center of the lane. When the behavior toward lane departure is detected continuously for a predetermined period, the drive assist apparatus determines that the driver continues to steer the vehicle with intention against the return steering torque, and limits the return steering torque. Thus, the vehicle can travel based on the driver's intended steering while suppressing either one of the lane keeping traveling control and the lane departure prevention control performed against the driver's intention.

As described above, JP-A Nos. 2010-36852 and H11-91606 disclose the drive assist apparatuses relating to the technologies for suppressing either one of the lane departure prevention control during the lane change and the lane keeping traveling control during the change of the traveling path with the driver's intention.

SUMMARY

An aspect of the disclosure provides a vehicle drive assist apparatus to be applied to a vehicle. The vehicle drive assist apparatus is configured to execute at least lane keeping traveling control for causing the vehicle to travel along a traveling lane and lane departure prevention control for suppressing departure of the vehicle from the traveling lane. The vehicle drive assist apparatus includes a surrounding situation information acquisition device, a steering torque sensor, a steering angle sensor, and a traveling controller. The surrounding situation information acquisition device is configured to acquire surrounding situation information of the vehicle. The steering torque sensor is configured to detect a steering torque applied by using a steering mechanism of the vehicle. The steering angle sensor is configured to detect a steering angle and a steering direction of the vehicle. The traveling controller is configured to centrally control an entire of the vehicle. The traveling controller includes a steering assist controller configured to execute traveling control involving steering assist control based on information output from the surrounding situation information acquisition device, information output from the steering torque sensor, and information output from the steering angle sensor. Upon detecting either one of the information output from the steering torque sensor and the information output from the steering angle sensor, the traveling controller is configured to create either one of a new target lane keeping traveling path and a predetermined target lane departure prevention traveling path of the vehicle based on a steering torque amount, the steering angle, and the steering direction of the vehicle. Upon detecting the either one of the information output from the steering torque sensor and the information output from the steering angle sensor again within a predetermined period, the traveling controller is configured to set the either one of the new target lane keeping traveling path and the predetermined target lane departure prevention traveling path and execute traveling control along the either one of the new target lane keeping traveling path and the predetermined target lane departure prevention traveling path.

An aspect of the disclosure provides a vehicle drive assist apparatus to be applied to a vehicle. The vehicle drive assist apparatus is configured to execute at least lane keeping traveling control for causing the vehicle to travel along a traveling lane and lane departure prevention control for suppressing departure of the vehicle from the traveling lane. The vehicle drive assist apparatus includes a surrounding situation information acquisition device, a steering torque sensor, a steering angle sensor, and circuitry. The surrounding situation information acquisition device is configured to acquire surrounding situation information of the vehicle. The steering torque sensor is configured to detect a steering torque applied by using a steering mechanism of the vehicle. The steering angle sensor is configured to detect a steering angle and a steering direction of the vehicle. The circuitry is configured to centrally control an entire of the vehicle. The circuitry is configured to execute traveling control involving steering assist control based on information output from the surrounding situation information acquisition device, information output from the steering torque sensor, and information output from the steering angle sensor. Upon detecting either one of the information output from the steering torque sensor and the information output from the steering angle sensor, the circuitry is configured to create either one of a new target lane keeping traveling path and a predetermined target lane departure prevention traveling path of the vehicle based on a steering torque amount, the steering angle, and the steering direction of the vehicle. Upon detecting the either one of the information output from the steering torque sensor and the information output from the steering angle sensor again within a predetermined period, the circuitry is configured to set the either one of the new target lane keeping traveling path and the predetermined target lane departure prevention traveling path and execute traveling control along the either one of the new target lane keeping traveling path and the predetermined target lane departure prevention traveling path.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
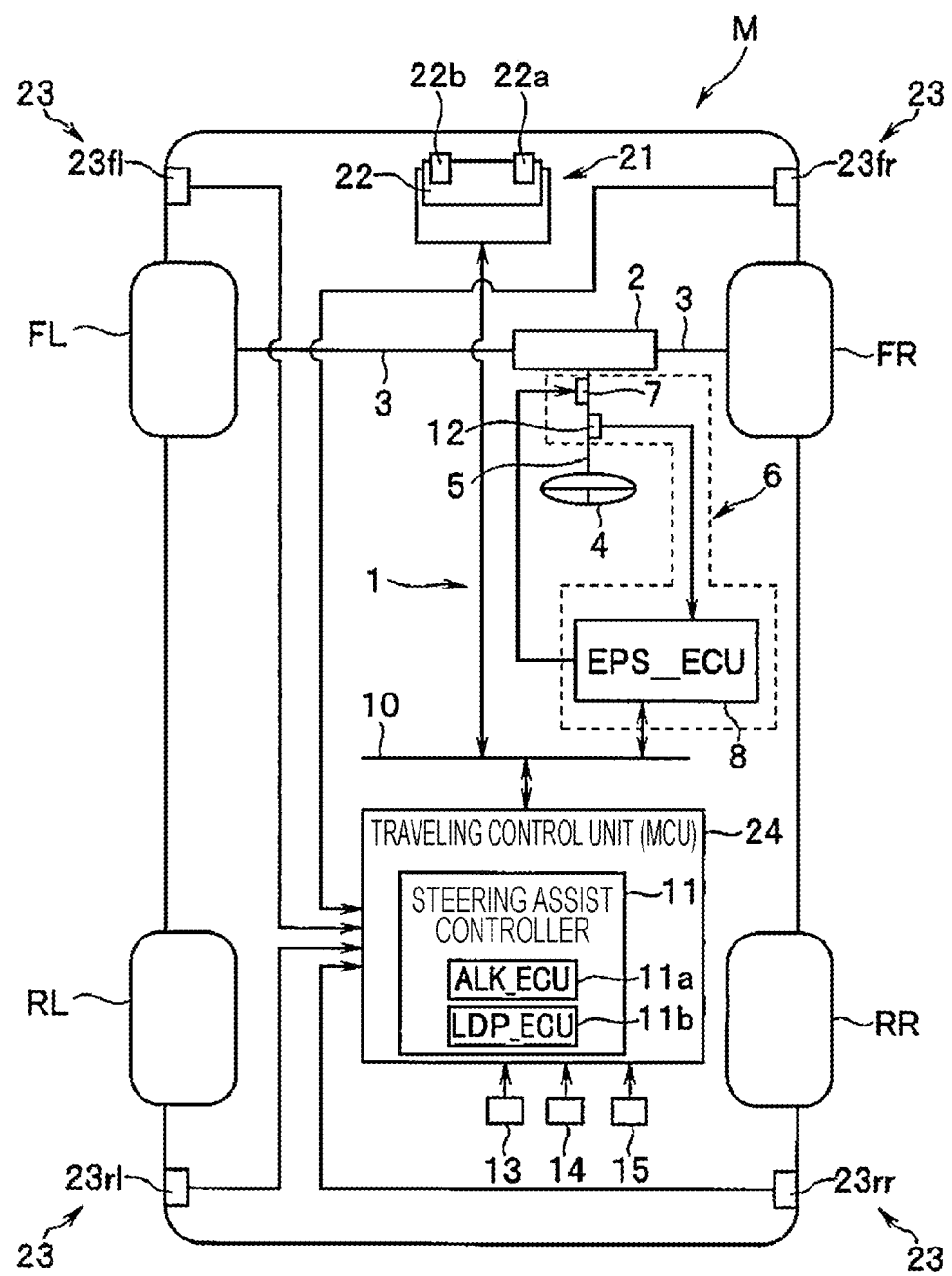
FIG. 1 is a block diagram illustrating a schematic configuration of a vehicle including a drive assist apparatus according to an embodiment of the disclosure.

For example, in a case where a driver is aware of an avoidance target in a traveling lane and steers a vehicle away from the avoidance target to continue traveling with a change to a traveling path departing from the center of the lane and then the avoidance target is no longer present, the traveling path (traveling path departing from the center of the lane) may be returned to the original traveling path (center of the lane).

The related-art drive assist apparatuses disclosed in JP-A Nos. 2010-36852 and H11-91606 have room for improvement toward traveling control for returning to the original traveling path after inappropriate one of the lane keeping traveling control and the lane departure prevention control is suppressed in response to the change of the traveling path by the driver's intended steering.

It is desirable to provide a vehicle drive assist apparatus that can perform more appropriate drive assist control without driver's discomfort by smooth traveling control in response to driver's intended steering.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A drive assist apparatus according to the embodiment of the disclosure is mounted on a vehicle such as an automobile, and executes drive assist control for assisting a driving operation of a driver of the vehicle. For example, the drive assist apparatus of this embodiment acquires information related to a surrounding situation around the vehicle by using various sensor devices such as an image sensor of a camera unit and a radar sensor of a radar device. The various sensor devices are autonomous sensor devices that operate autonomously.

The information related to the surrounding situation around the vehicle is information related to avoidance targets such as moving objects typified by pedestrians, bicycles, and other vehicles including two-wheel vehicles, such as a preceding vehicle, a succeeding vehicle, and an oncoming vehicle traveling around the vehicle and another vehicle traveling beside the vehicle, stationary objects typified by various three-dimensional structures including curbstones, guardrails, side walls, and utility poles and other vehicles parked or stopped in road side areas (road shoulders), and various objects around the traveling vehicle. The information related to the surrounding situation around the vehicle is hereinafter referred to as "surrounding situation information". As described above, the surrounding situation information is acquired by using the various sensor devices.

The drive assist apparatus of this embodiment uses the acquired surrounding situation information as appropriate in the drive assist control for assisting the driving operation of the driver of the vehicle.

Examples of the drive assist control to be executed by the drive assist apparatus of this embodiment include active lane keeping (ALK) traveling control and lane departure prevention (LDP) control.

Figure 2:
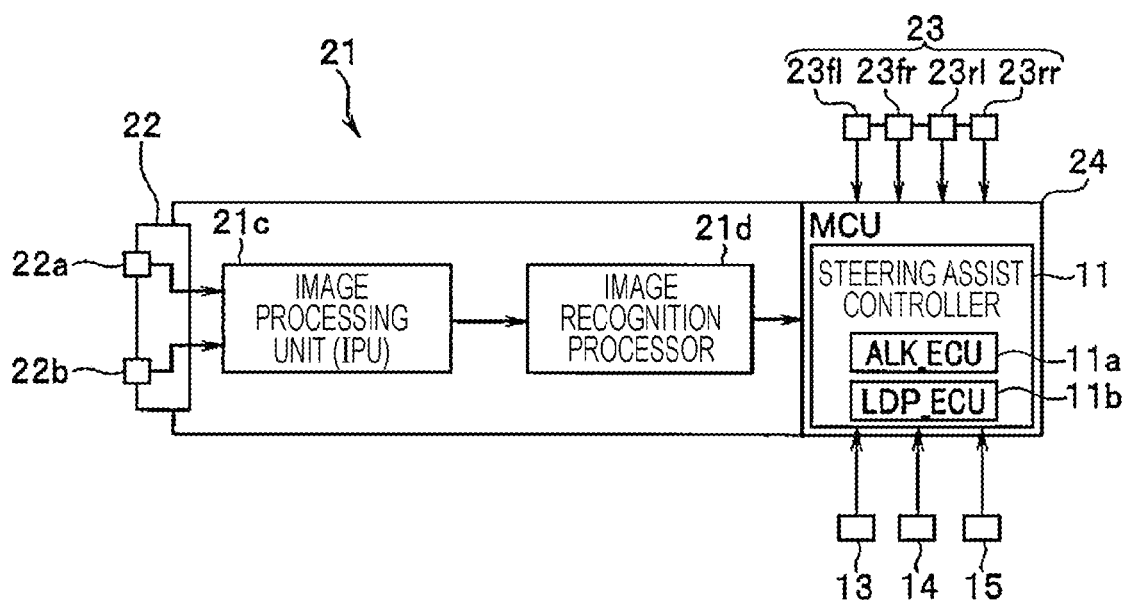
FIG. 2 is a block diagram illustrating a schematic configuration around a camera unit and a traveling control unit (MCU) of the drive assist apparatus according to the embodiment of the disclosure.

The schematic configuration of the drive assist apparatus according to the embodiment of the disclosure is described with reference to FIG. 1 and FIG. 2. FIG. 1 is a block diagram illustrating the schematic configuration of the vehicle including the drive assist apparatus according to the embodiment of the disclosure. FIG. 2 is a block diagram illustrating a schematic configuration around a camera unit and a traveling control unit (MCU) of the drive assist apparatus according to the embodiment of the disclosure.

A drive assist apparatus 1 of this embodiment is mounted on a vehicle M such as an automobile. The drive assist apparatus 1 basically has a configuration substantially similar to those of related-art drive assist apparatuses of the same type. FIG. 1 and FIG. 2 illustrate constituent elements related directly to the embodiment of the disclosure among the constituent elements of the drive assist apparatus 1 of this embodiment, and illustration is omitted for constituent elements that are not related directly to the embodiment of the disclosure. The constituent elements other than the constituent elements related directly to the embodiment of the disclosure are not described in detail below under the assumption that the constituent elements are substantially similar to those of the related-art drive assist apparatuses, and the constituent elements related directly to the embodiment of the disclosure are described in detail below.

As illustrated in FIG. 1, the drive assist apparatus 1 of this embodiment includes a camera unit 21, a radar device 23, a traveling control unit 24 including a steering assist controller 11, and an electric power steering (EPS) device 6 (hereinafter referred to as "EPS device 6"). In one embodiment, the camera unit 21 and the radar device 23 may serve as a "surrounding situation information acquisition device". In one embodiment, the traveling control unit 24 may serve as a "traveling controller".

As illustrated in FIG. 1 and FIG. 2, the camera unit 21 includes an on-board camera 22, an image processing unit (IPU) 21c (not illustrated in FIG. 1; hereinafter referred to as "IPU 21c"), and an image recognition processor 21d (not illustrated in FIG. 1). The on-board camera 22 is a stereo camera including a main camera 22a and a subcamera 22b, and is a surrounding situation acquisition sensor and an autonomous sensor device. The IPU 21c is coupled to the on-board camera 22 (22a, 22b). The IPU 21c is coupled to the image recognition processor 21d.

For example, the on-board camera 22 is disposed on an upper front part of a rearview mirror at the front of a cabin of the vehicle M, that is, at a position close to the inner surface of a windshield of the vehicle M. In this case, the two cameras (22a, 22b) of the on-board camera 22 are arranged in a horizontal direction with substantially equal distances to right and left from the center in a width direction of the vehicle M.

For example, the on-board camera 22 is the autonomous sensor device that senses a real space ahead of the vehicle M to acquire image information on a surrounding situation ahead of the vehicle M. The main camera 22a and the subcamera 22b of the on-board camera 22 are bilaterally symmetrical across the center in the vehicle width direction. The on-board camera 22 acquires data on two images captured by the two cameras (22a, 22b) from different viewpoints in an area within a predetermined range ahead of the vehicle M.

The IPU 21c is a circuit unit that performs predetermined image processing based on the data on the two images acquired by the on-board camera 22 (22a, 22b). For example, the IPU 21c generates stereoscopic image information (three-dimensional image information) based on the data on the two images acquired by the on-board camera 22 (22a, 22b), and generates image information including distance information (hereinafter referred to as "distance image information") obtained from positional deviation amounts on the same target in the two images. The generated distance image information is transmitted to the image recognition processor 21d.

The image recognition processor 21d functions as a surrounding situation recognition processor that receives the distance image information from the IPU 21c and recognizes a surrounding situation around the vehicle M based on the distance image information.

For example, the image recognition processor 21d recognizes right and left lane lines of a traveling lane of a road where the vehicle M is traveling, and obtains various types of information such as a road curvature [1/m] between the right and left lane lines and a width between the right and left lane lines (lane width).

The image recognition processor 21d performs predetermined pattern matching based on the distance image information to recognize various three-dimensional objects (avoidance targets) such as curbstones, guardrails, side walls, and utility poles along the road, and pedestrians, bicycles, and other vehicles including two-wheel vehicles on the road where the vehicle M is traveling. The recognition of the target by the image recognition processor 21d includes acquisition of various types of information such as a type of the target, a distance to the target, a moving speed of the target, and a relative speed between the target and the vehicle M.

The camera unit 21 of the drive assist apparatus 1 acquires surrounding situation information by recognizing a surrounding situation around the vehicle M based on image data of the surrounding situation acquired by the on-board camera 22 that is the autonomous sensor device serving as the surrounding situation acquisition sensor. In one embodiment, the camera unit 21 of the drive assist apparatus 1 may serve a "surrounding situation information acquisition device".

The traveling control unit 24 is a processor including hardware constituted by a known microcontroller unit (MCU) and peripheral devices around the MCU. For example, the MCU includes a central processing unit (CPU), a random access memory (RAM), a read only memory (ROM), a non-volatile memory, a non-volatile storage, and a non-transitory computer readable medium. The ROM, the non-volatile memory, and the non-volatile storage prestore software programs to be executed by the MCU and fixed data such as data tables. The MCU reads the software programs stored in the ROM and the like and executes the software programs by loading the software programs in the RAM. The software programs implement predetermined functions of the units in the drive assist apparatus 1 of this embodiment by referring to various types of data as appropriate.

The processor may be implemented by a semiconductor chip such as a field programmable gate array (FPGA). The software programs may entirely or partly be recorded as computer program products in a non-transitory computer readable medium such as a portable sheet medium typified by a flexible disk, a CD-ROM, or a DVD-ROM, a card memory, a hard disk drive (HDD), or a solid state drive (SSD).

Various units including various sensor devices such as the camera unit 21 and the radar device 23 are coupled to the traveling control unit (MCU) 24. The traveling control unit 24 controls operation statuses of the various coupled units, performs predetermined traveling control as appropriate by receiving detection results from the various sensor devices (surrounding situation information), and centrally controls the entire drive assist apparatus 1 of this embodiment.

Examples of the various sensor devices for recognizing the surrounding situation around the vehicle M include the on-board camera 22 in the camera unit 21, radar sensors (23*fl*, 23*fr*, 23*rl*, 23*rr*) in the radar device 23, a vehicle speed sensor 13 that detects a current vehicle speed of the vehicle M by detecting rotation speeds of right and left wheels at the front and rear of the vehicle M, either one of a lateral acceleration sensor and a yaw rate sensor 14 that detects a yaw rate and a lateral acceleration of the vehicle M, a steering angle sensor 15 that detects a steering angle of the vehicle M, a gyro sensor (not illustrated) that detects either one of an angular velocity and an angular acceleration of the vehicle M, and a global navigation satellite system (GNSS) receiver (not illustrated) that receives positioning signals from a plurality of positioning satellites.

As illustrated in FIG. 2, the drive assist apparatus 1 of this embodiment includes the radar device 23 that may serve as the surrounding situation information acquisition device. The radar device 23 is coupled to the traveling control unit 24. The radar device 23 acquires data related to the surrounding situation, performs a predetermined process, and outputs, to the traveling control unit 24, recognition data in a predetermined format including the surrounding situation information.

The radar device 23 includes a plurality of radar sensors. The radar device 23 of this embodiment includes four radar sensors in the vehicle M. Examples of the plurality of (four) radar sensors include a right front side radar sensor 23*fr*, a left front side radar sensor 23*fl*, a right rear side radar sensor 23*rr*, and a left rear side radar sensor 23*rl*.

Among the four radar sensors (23*fl*, 23*fr*, 23*rl*, 23*rr*) of the radar device 23, the right front side radar sensor 23*fr* and the left front side radar sensor 23*fl* are provided, for example, on right and left sides of a front bumper of the vehicle M. The right front side radar sensor 23*fr* and the left front side radar sensor 23*fl* recognize objects in right and left obliquely forward and side areas around the vehicle M. Those areas cannot be recognized from data on two images acquired by the on-board camera 22 (22a, 22b). The areas recognized by the right front side radar sensor 23*fr* and the left front side radar sensor 23*fl* partly overlap the areas recognized by the on-board camera 22 (22a, 22b). Thus, the on-board camera 22 (22a, 22b), the right front side radar sensor 23*fr*, and the left front side radar sensor 23*fl* may recognize the substantially entire areas from the right and left front sides to the front of the vehicle M.

Among the four radar sensors (23*fl*, 23*fr*, 23*rl*, 23*rr*) of the radar device 23, the right rear side radar sensor 23*rr* and the left rear side radar sensor 23*rl* are provided, for example, on right and left sides of a rear bumper of the vehicle M. The right rear side radar sensor 23*rr* and the left rear side radar sensor 23*rl* recognize objects in areas from right and left rear sides to the rear of the vehicle M. Those areas cannot be recognized by the right front side radar sensor 23*fr* and the left front side radar sensor 23*fl*. The areas recognized by the right rear side radar sensor 23*rr* and the left rear side radar sensor 23*rl* partly overlap each other. Thus, the right rear side radar sensor 23*rr* and the left rear side radar sensor 23*rl* may recognize the substantially entire areas from the right and left rear sides to the rear of the vehicle M.

The radar device 23 acquires surrounding situation information of the vehicle M by recognizing, for example, positions, relative speeds, and sizes of three-dimensional objects (avoidance targets) at the front, rear, and right and left sides of the vehicle M. In one embodiment, the radar device 23 may serve as a "surrounding situation information acquisition device".

The information related to the three-dimensional objects recognized by the radar device 23 is input to the traveling control unit 24. In response to the information, the traveling control unit 24 recognizes, as the three-dimensional objects, other vehicles around the vehicle M, such as a preceding vehicle, a vehicle traveling beside the vehicle M on the right or left side, a succeeding vehicle, and a vehicle approaching the vehicle M at an intersection from a road intersecting the traveling road of the vehicle M, and various moving objects such as a pedestrian and a bicycle around the vehicle M.

Examples of the radar device 23 include a millimeter wave radar device, a laser radar device, and a light detection and ranging (LiDAR) device.

The traveling control unit 24 includes the steering assist controller 11. For example, the steering assist controller 11 is implemented by an electronic circuit in the traveling control unit 24.

The steering assist controller 11 may be implemented by a processor including hardware independent of the traveling control unit 24 instead of being provided in the traveling control unit 24.

The steering assist controller 11 of the drive assist apparatus 1 of this embodiment performs traveling control involving steering assist control, such as lane keeping traveling control and lane departure prevention control, among various types of control to be executed by the drive assist apparatus 1 of this embodiment. For example, the steering assist controller 11 includes a lane keeping traveling control unit (hereinafter referred to as "ALK_ECU") 11a and a lane departure prevention control unit (hereinafter referred to as "LDP_ECU") 11b.

The ALK_ECU 11a contributes to steering assist control for causing the vehicle M to travel stably in a traveling lane (lane keeping control). The lane keeping traveling control is the following traveling control including steering control. Right and left lane lines of the traveling lane of the vehicle M and surrounding three-dimensional structures (avoidance targets such as curbstones, guardrails, side walls, and utility poles) are recognized based on a surrounding situation ahead and on the sides of the vehicle M that is recognized by the surrounding situation acquisition sensors such as the on-board camera 22 of the camera unit 21 and the radar sensors (23fl, 23fr, 23rl, 23rr) of the radar device 23. Then, the vehicle M is caused to travel along the center between the right and left lane lines by the steering control.

The LDP_ECU 11b contributes to steering assist control for assisting the driver's steering when avoiding danger encountered while the vehicle M is traveling along a traveling lane, for example, either one of collision and contact between the vehicle M and an obstacle on a traveling road (lane departure prevention control). The lane departure prevention control is the following traveling control. A surrounding situation including right and left lane lines of the traveling lane of the vehicle M and surrounding three-dimensional structures (avoidance targets such as curbstones, guardrails, side walls, and utility poles) is recognized based on a surrounding situation ahead and on the sides of the vehicle M that is recognized by the surrounding situation acquisition sensors such as the on-board camera 22 of the camera unit 21 and the radar sensors (23fl, 23fr, 23rl, 23rr) of the radar device 23. When determination is made that the traveling direction of the vehicle M is likely to depart from the traveling lane, predetermined steering control is performed to control a steering torque so that the vehicle M travels parallel to the right and left lane lines, thereby avoiding or suppressing the departure of the vehicle M from the traveling lane.

The configurations of the ALK_ECU 11a and the LDP_ECU 11b applied to the drive assist apparatus 1 of this embodiment are substantially similar to those applied to the related-art drive assist apparatuses of the same type. Therefore, further details of the configurations of those control units are omitted.

The EPS device 6 is a unit for performing predetermined steering assist control at a predetermined timing as appropriate.

As illustrated in FIG. 1, the vehicle M includes right and left front wheels FR and FL and right and left rear wheels RR and RL. The right and left front wheels FR and FL are coupled to a steering mechanism 2 including a rack and pinion mechanism via tie rods 3. A steering shaft 5 with a steering wheel 4 fixed at its distal end is coupled to the steering mechanism 2. When the driver operates the steering wheel 4, the right and left front wheels FR and FL are turned via the steering shaft 5 and the steering mechanism 2. The steering mechanism 2, the tie rods 3, the steering wheel 4, and the steering shaft 5 constitute a steering mechanism of the vehicle M. This steering mechanism has a configuration substantially similar to those of related-art steering mechanisms generally mounted on vehicles such as automobiles.

The EPS device 6 acts on the steering shaft 5 of the steering mechanism. The EPS device 6 includes an EPS motor 7, an EPS control unit (EPS_ECU) 8, and a steering torque sensor 12.

Although illustration is omitted, the vehicle M includes, in addition to the EPS_ECU 8, the traveling control unit 24, and the camera unit 21, various control units that control traveling conditions of the vehicle, such as a transmission control unit, a brake control unit, and a drive source control unit that controls a drive source such as an engine or an electric motor. The various control units are coupled in a bidirectionally communicable manner via an internal network using a controller area network (CAN) communication 10.

The EPS motor 7 of the EPS device 6 is coupled to the steering shaft 5 via a transmission mechanism (not illustrated). The EPS_ECU 8 controls a steering torque to be applied to the steering shaft 5 by the EPS motor 7.

The steering torque sensor 12 is a sensor device that detects a steering torque applied to the steering wheel 4 as a driving operation amount of the driver. The steering torque sensor 12 is attached to the steering shaft 5. The steering torque sensor 12 is coupled to the EPS_ECU 8. A detection result from the steering torque sensor 12 is output to the EPS_ECU 8.

The EPS_ECU 8 sets a torque (assist torque) for assisting the steering torque applied to the steering wheel 4 by the driver based on pieces of data on the steering torque detected by the steering torque sensor 12 and the vehicle speed of the vehicle M detected by the vehicle speed sensor 13. By applying the assist torque to the steering shaft 5, steering assist for the driver is performed while reducing a load on the driver's steering operation.

The sensor devices that detect behavior of the vehicle M are coupled to the traveling control unit 24. The sensor devices include the vehicle speed sensor 13 that detects a vehicle speed, the yaw rate sensor 14 that detects a yaw rate and a lateral acceleration on a vehicle body, and the steering angle sensor 15 that detects a steering angle and a steering direction based on a rotation angle of the steering shaft 5.

The ALK_ECU 11a and the LDP_ECU 11b of the traveling control unit 24 execute traveling control including predetermined steering control as appropriate in response to outputs from the various sensor devices. The above is the schematic configuration of the drive assist apparatus 1 of this embodiment.

Figure 3:
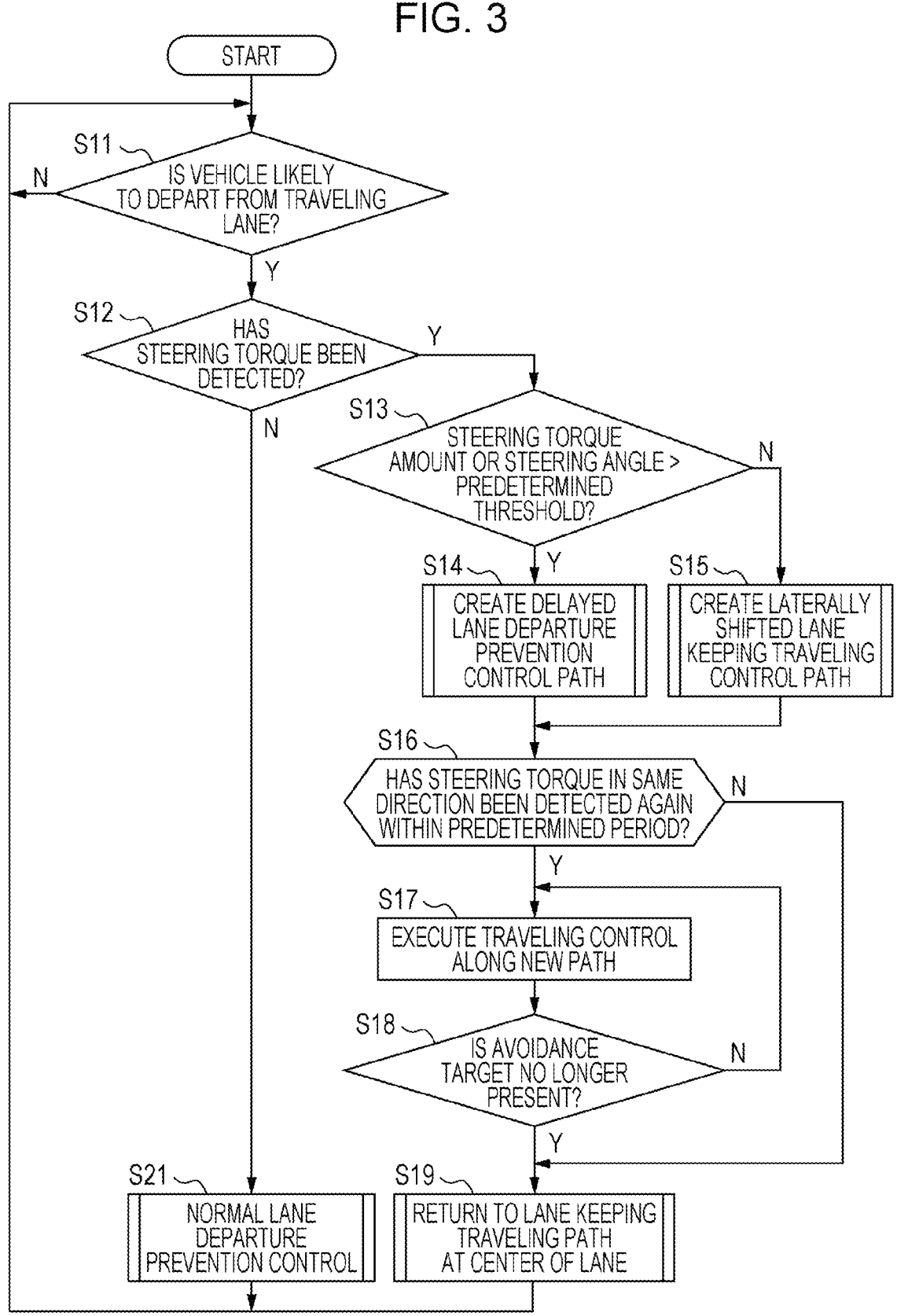
FIG. 3 is a flowchart illustrating an operation of the drive assist apparatus according to the embodiment of the disclosure.

Next, operations of the drive assist apparatus of this embodiment in the lane keeping traveling control and the lane departure prevention control are described with reference to FIG. 3 to FIG. 6. FIG. 3 is a flowchart illustrating an operation of the drive assist apparatus according to the embodiment of the disclosure when performing the lane keeping traveling control and the lane departure prevention control.

Figure 4:
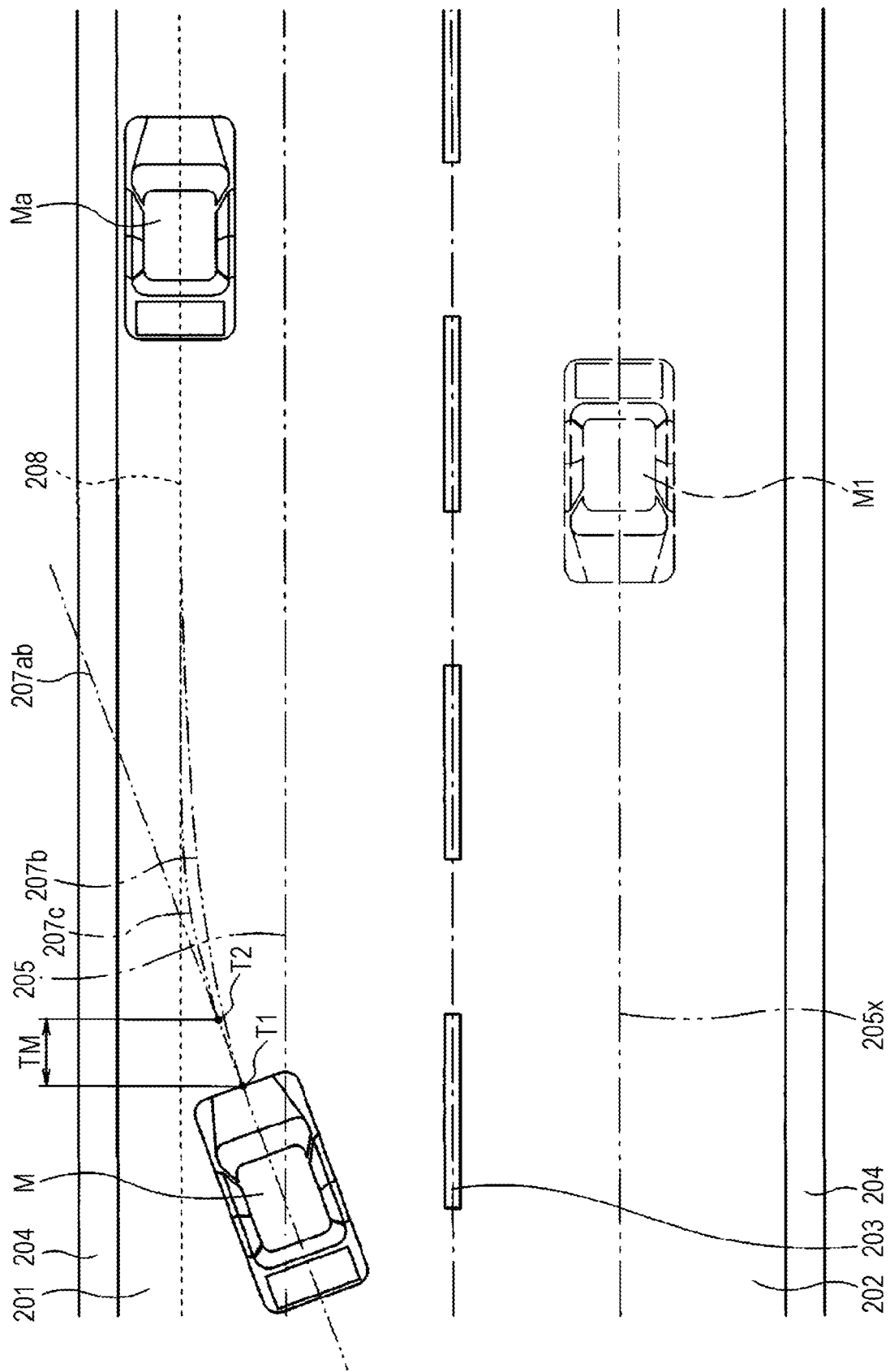
FIG. 4 is a conceptual diagram illustrating a situation in which the drive assist apparatus according to the embodiment of the disclosure performs lane departure prevention control.
Figure 5:
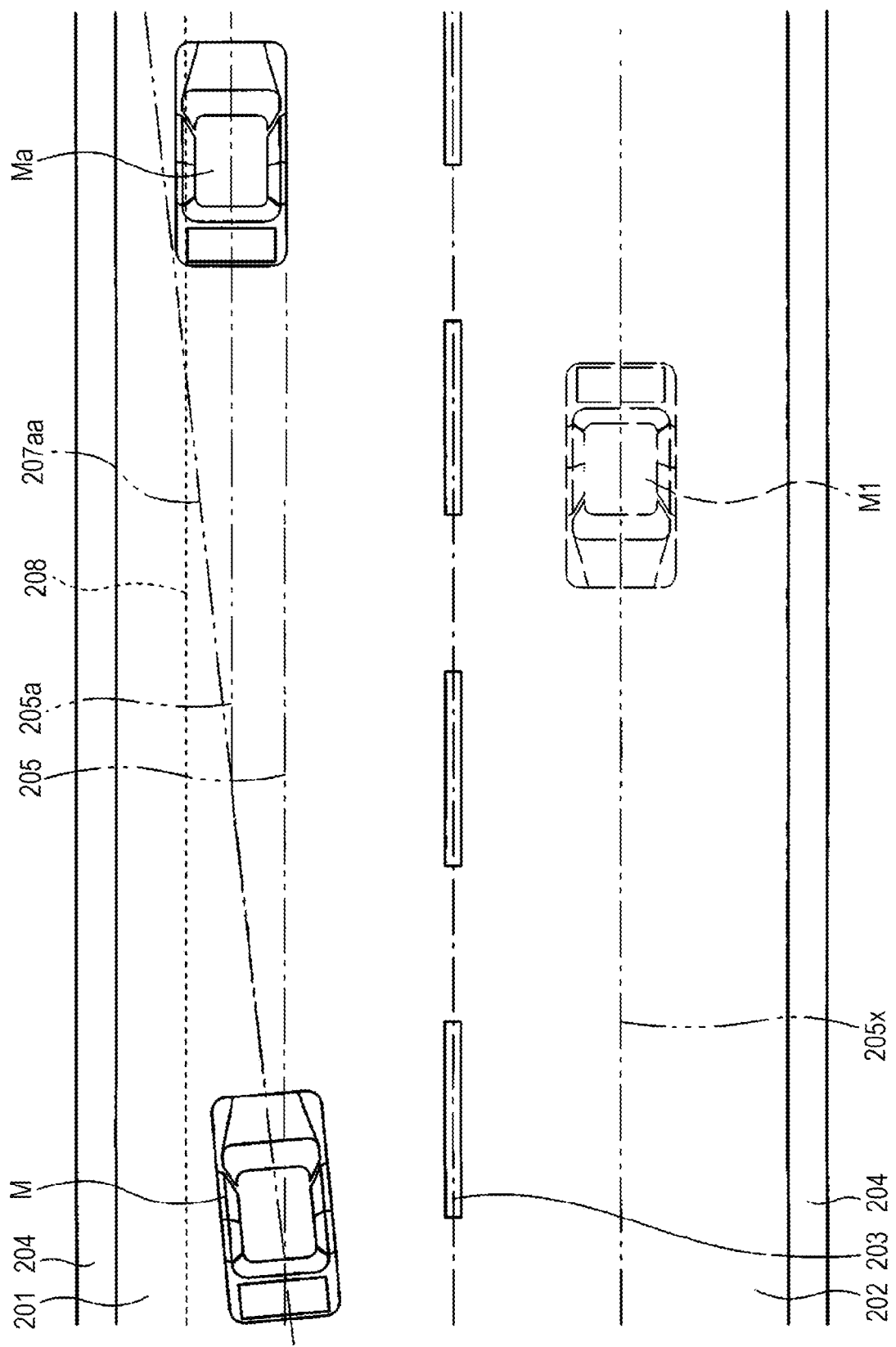
FIG. 5 is a conceptual diagram illustrating a situation in which the drive assist apparatus according to the embodiment of the disclosure performs lane keeping traveling control during leftward steering.
Figure 6:
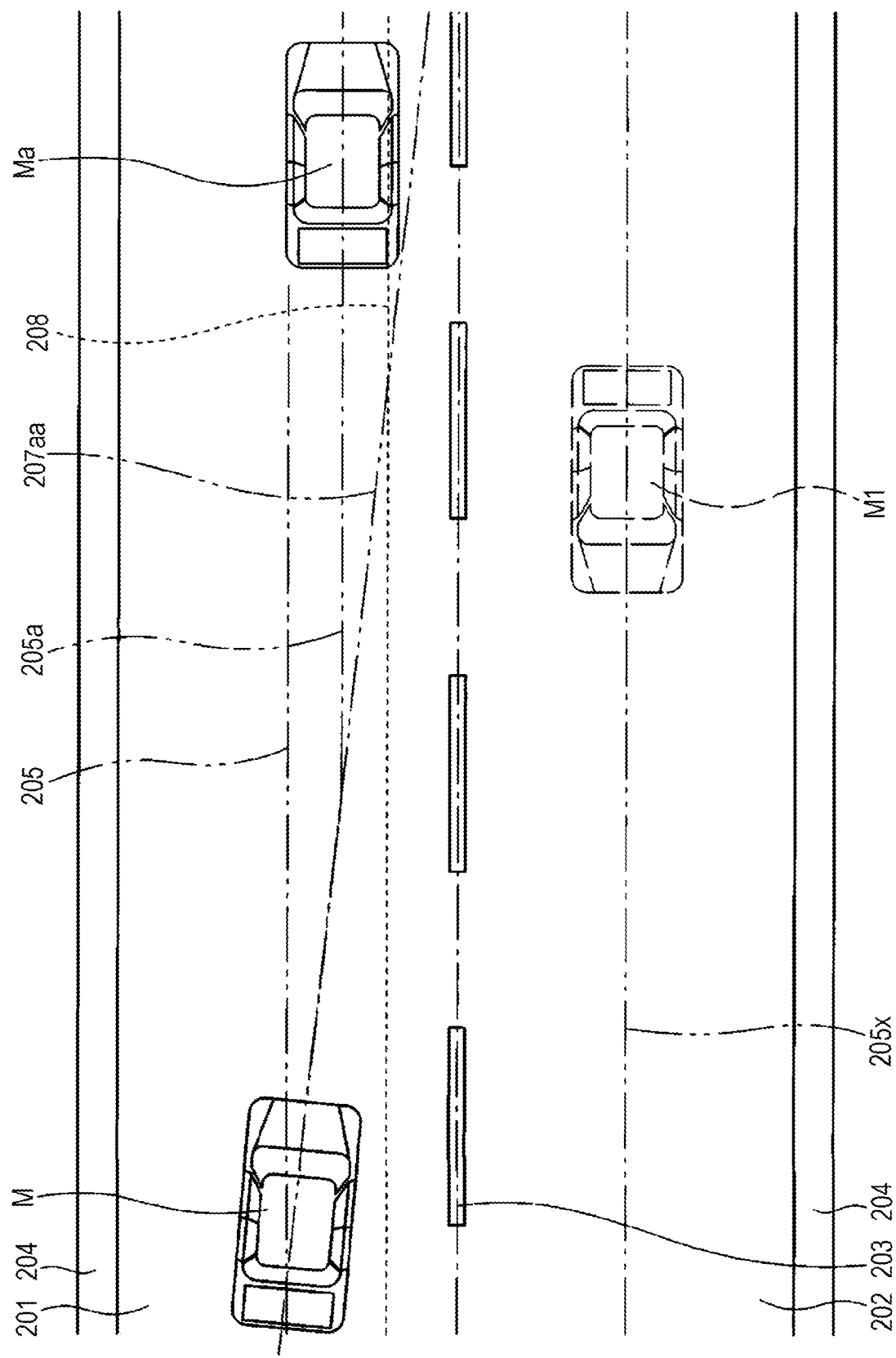
FIG. 6 is a conceptual diagram illustrating a situation in which the drive assist apparatus according to the embodiment of the disclosure performs the lane keeping traveling control during rightward steering.

FIG. 4 is a conceptual diagram illustrating a situation in which the drive assist apparatus according to the embodiment of the disclosure performs the lane departure prevention control. FIG. 5 and FIG. 6 are conceptual diagrams illustrating situations in which the drive assist apparatus according to the embodiment of the disclosure performs the lane keeping traveling control when the vehicle is steered leftward and rightward, respectively. FIG. 5 illustrates an example of steering toward a road shoulder (left side). FIG. 6 illustrates an example of steering toward a road center line (right side).

The following description of this embodiment is directed to a road system of left-hand traffic in which the traveling section of the vehicle is the left side as illustrated in FIG. 4, FIG. 5, and FIG. 6. The configuration of the embodiment of the disclosure can easily be applied to a road system of right-hand traffic by switching right and left. In the following description of this embodiment, the right and left are defined under the assumption that the vehicle faces a target.

First, it is assumed that the vehicle M including the drive assist apparatus 1 according to the embodiment of the disclosure (hereinafter referred to as "vehicle M") is traveling along an ordinary road having no three-dimensional structure such as a median strip while executing the lane keeping traveling control. The vehicle M can further execute the lane departure prevention control at any time (that is, the lane departure prevention control is on standby). In this case, the traveling control unit 24 of the drive assist apparatus 1 of the traveling vehicle M continuously receives signals from the steering torque sensor 12. For example, when the steering torque sensor 12 detects a steering torque generated by a steering operation of the driver of the vehicle M, the traveling control unit 24 executes predetermined traveling control as appropriate based on the received detection result of the steering torque.

For example, the situations illustrated in FIG. 4, FIG. 5, and FIG. 6 are assumed. Although details are described later, the exemplary situation illustrated in FIG. 4 is outlined as follows. For example, the lane departure prevention control is executed when determination is made that the vehicle M is likely to depart from the lane in a case where the driver of the vehicle M executing the lane keeping traveling control is aware of either one of an oncoming vehicle M1 and a vehicle parked or stopped in an oncoming lane (not illustrated; the traveling oncoming vehicle and the vehicle parked or stopped in the oncoming lane are hereinafter referred to collectively as "oncoming vehicle") irrespective of whether the oncoming vehicle is present and steers the vehicle M away from the oncoming vehicle (M1), that is, in the leftward direction (toward the road shoulder).

In the following description, the term "oncoming vehicle" means not only the traveling oncoming vehicle M1 but also a vehicle parked or stopped in the oncoming lane (not illustrated). In the following description, the simple terms "oncoming vehicle", "oncoming vehicle M1", and "oncoming vehicle (M1)" may be replaced with terms "vehicle parked or stopped in oncoming lane" and "vehicle in oncoming lane" in the same meanings.

The exemplary situations illustrated in FIG. 5 and FIG. 6 are outlined as follows. For example, the lane keeping traveling control is executed when determination is made that the vehicle M is unlikely to depart from the lane in a case where the driver of the vehicle M executing the lane keeping traveling control is aware of the oncoming vehicle M1 irrespective of whether the oncoming vehicle M1 is present and steers the vehicle M away from the oncoming vehicle M1, that is, in the leftward direction (toward the road shoulder) (see FIG. 5), or in a case where the driver of the vehicle M is aware of a side wall 204 on the left side (near the road shoulder of the traveling lane) and steers the vehicle M in the rightward direction (toward the road center line) (see FIG. 6).

In FIG. 4, FIG. 5, and FIG. 6, reference symbol 201 represents the traveling lane of the vehicle M (hereinafter referred to as "lane 201"). Reference symbol 202 represents the oncoming lane adjacent parallel to the lane 201. Reference symbol 203 represents the road center line between the lane 201 and the oncoming lane 202. In this case, the road center line 203 is a white broken line. At the left edge of the lane 201 (hereinafter referred to as "road shoulder side"), the side wall 204 is present along the lane 201. The side wall 204 is also present in the oncoming lane 202 on the road shoulder side of the oncoming vehicle M1 traveling along the oncoming lane 202.

The vehicle M is traveling along the lane 201 of the road by the lane keeping traveling control. The drive assist apparatus 1 of the vehicle M sets a target lane keeping traveling path (imaginary line represented by reference symbol 205; two-dot chain line) at a predetermined position in the lane 201, and executes traveling control for causing the vehicle M to travel along the target lane keeping traveling path 205. The target lane keeping traveling path 205 is an imaginary line set based on a surrounding situation around the vehicle M. The target lane keeping traveling path 205 is normally set at a substantially central position in the lane 201.

In FIG. 4, FIG. 5, and FIG. 6, reference symbol M1 represents the oncoming vehicle traveling along the oncoming lane 202. The oncoming vehicle M1 represented by broken lines in FIG. 4, FIG. 5, and FIG. 6 is traveling in the oncoming lane 202 along a target lane keeping traveling path 205x set at a substantially central position in the oncoming lane 202.

In the situations described above, the traveling control unit 24 of the drive assist apparatus 1 of the vehicle M checks in Step S11 of FIG. 3 whether the vehicle M is likely to depart from the current traveling lane (lane 201). Whether the vehicle M is likely to depart from the lane is determined by checking whether the vehicle M is traveling along a position departing from the currently set target lane keeping traveling path 205 based on signals from, for example, the surrounding situation information acquisition device (camera unit 21 and radar device 23), the steering torque sensor 12, and the steering angle sensor 15.

When determination is made in the process of Step S11 of FIG. 3 that the vehicle M is likely to depart from the lane 201, the process proceeds to Step S12. When determination is made in the process of Step S11 that the vehicle M is unlikely to depart from the lane 201, the current lane keeping traveling control is continued.

In Step S12, the traveling control unit 24 checks whether a steering torque has been generated in the vehicle M based on signals from the steering torque sensor 12 and the steering angle sensor 15. When the steering torque has been detected, the process proceeds to Step S13. When the steering torque has not been detected, the process proceeds to Step S21.

In Step S21, the traveling control unit 24 executes normal lane departure prevention control. Then, the process returns to Step S11 to continue the lane keeping traveling control. Thus, traveling control is performed to cause the vehicle M to avoid the departure from the lane 201 and return to and travel along the target lane keeping traveling path 205 set at the center of the lane during the normal control.

For example, the normal lane departure prevention control includes a series of processes for preventing the departure of the vehicle M from the lane 201 by creating a target lane departure prevention traveling path 207b illustrated in FIG. 4 and then controlling the vehicle M to travel along the target lane departure prevention traveling path 207b.

The target lane departure prevention traveling path 207b illustrated in FIG. 4 is created by the lane departure prevention control started at a timing when the process proceeds to Step S21.

In Step S13, the traveling control unit 24 checks whether at least one of a steering torque amount or a steering angle related to the steering torque detected in the process of Step S12 is larger than a predetermined threshold.

For example, when at least one of the result output from the steering torque sensor 12 (steering torque amount) or the result output from the steering angle sensor 15 (steering angle) is not larger than a predetermined value, the vehicle M is presumed to travel along a leftward or rightward predicted traveling path represented by reference symbol 207aa (two-dot chain line) in FIG. 5 or 6. The predicted traveling path 207aa intersects a left or right departure determination lateral position imaginary line 208 (dotted line) preset in the lane 201 after an elapse of a predetermined relatively long period.

The departure determination lateral position imaginary line 208 is set along the left or right edge of the lane 201 (for example, either one of the side wall 204 and the road center line 203) at a position away from the edge (either one of the side wall 204 and the road center line 203) by a predetermined distance toward the lane 201. Determination is made that the vehicle M is likely to depart from the lane when the traveling path of the vehicle M is predicted to depart toward either one of the left and right sides beyond the departure determination lateral position imaginary line 208.

When the vehicle M continues to travel while keeping the current steering torque amount or steering angle (that is not larger than the predetermined value), the vehicle M is presumed to take the predetermined relatively long period to depart from the lane 201 (until the traveling path of the vehicle M intersects the departure determination lateral position imaginary line 208). Even if the vehicle M is likely to depart from the lane after a while as in the determination in Step S11, determination can be made that the vehicle M is unlikely to depart from the lane within a predetermined short period. When the vehicle M is in such a situation (either one of the steering torque amount and the steering angle is not larger than the predetermined threshold), the drive assist apparatus 1 advances the process to Step S15.

In Step S15, the traveling control unit 24 performs a process for creating a new target lane keeping traveling path 205a by the lane keeping traveling control. As illustrated in FIG. 5 and FIG. 6, the new target lane keeping traveling path 205a is shifted leftward or rightward by a predetermined distance from the currently set target lane keeping traveling path 205 based on the input steering torque amount or steering angle. Then, the process proceeds to Step S16.

For example, when at least one of the result output from the steering torque sensor 12 (steering torque amount) or the result output from the steering angle sensor 15 (steering angle) is larger than the predetermined value, the vehicle M is presumed to travel along a leftward predicted traveling path (toward the road shoulder) represented by reference symbol 207ab (two-dot chain line) in FIG. 4. The predicted traveling path 207ab intersects the left (road shoulder side) departure determination lateral position imaginary line 208 (dotted line) preset in the lane 201 after an elapse of a predetermined relatively short period.

When the vehicle M continues to travel while keeping the current steering torque amount or steering angle (that is larger than the predetermined value), the vehicle M is presumed to depart from the lane 201 within the predetermined relatively short period. When the vehicle M is in such a situation (either one of the steering torque amount and the steering angle is larger than the predetermined threshold), the drive assist apparatus 1 advances the process to Step S14.

In Step S14, the traveling control unit 24 performs a process for creating a predetermined target lane departure prevention traveling path 207c different from the target lane departure prevention traveling path 207b during the normal control by the lane departure prevention control (see FIG. 4).

For example, the predetermined target lane departure prevention traveling path 207c illustrated in FIG. 4 is created by delaying its start timing by a predetermined period compared with the start timing of the normal control.

For example, a traveling path represented by reference symbol 207b in FIG. 4 is the target lane departure prevention traveling path during the normal control. The control start timing is represented by reference symbol T1 in FIG. 4 (timing when the process proceeds to Step S21). In FIG. 4, a traveling path represented by reference symbol 207c is the target lane departure prevention traveling path when the steering input has been detected. The control start timing is represented by reference symbol T2 in FIG. 4. Reference symbol TM in FIG. 4 represents a time difference between the control start timings.

For example, in a situation in which the vehicle M is likely to depart from the lane 201 by driver's intended steering (situation in FIG. 4), the start timing of the lane departure prevention control is delayed by the predetermined period represented by reference symbol TM in FIG. 4. Thus, the lane departure prevention control is not performed immediately. By taking such an action, the driver does not feel discomfort. At this time, the target lane departure prevention traveling path 207c is set based on the steering amount, the steering angle, and the steering direction of the driver. When the lane departure prevention control is performed by using the target lane departure prevention traveling path 207c, appropriate steering is performed while the vehicle M exhibits behavior along the driver's steering intention, thereby preventing the lane departure of the vehicle M without causing the driver's discomfort. Then, the process proceeds to Step S16.

In Step S16, the traveling control unit 24 checks whether, after the steering torque has been detected in the process of Step S12, the steering torque in the same direction is detected again before an elapse of a predetermined period (for example, 1 minute). That is, the traveling control unit 24 checks whether the steering torque is detected multiple times, including the steering torque detected in the process of Step S12, within the predetermined period from the timing when the steering torque has been detected in the process of Step S12.

When the steering torque is detected again, the driver is presumed to, for example, continue the steering in the same direction with intention. In this case (where the steering torque is detected again), the process proceeds to Step S17. When the steering torque is not detected again, the process proceeds to Step S19 under the presumption that the driver's intended steering is terminated.

In Step S17, the traveling control unit 24 executes traveling control along the new traveling path created in Step S14 or S15.

For example, when the predetermined target lane departure prevention traveling path 207c (see FIG. 4) is created in the process of Step S14, the lane departure is suppressed by performing traveling control along the predetermined target lane departure prevention traveling path 207c in Step S17. Then, traveling control is performed to cause the vehicle M to travel along the departure determination lateral position imaginary line 208 for a while. In FIG. 4, reference symbol Ma represents a position of the vehicle at this time.

That is, after the lane departure is suppressed by performing the traveling control along the predetermined target lane departure prevention traveling path 207c, the lane keeping traveling control is not immediately performed but the traveling control is performed along the position near the road shoulder. Then, the process proceeds to Step S18.

For example, when the new target lane keeping traveling path 205a (see FIG. 5 and FIG. 6) is created in the process of Step S15, traveling control is performed along the new target lane keeping traveling path 205a in Step S17. In this control, the vehicle M travels for a while along the new target lane keeping traveling path 205a shifted in the lateral direction by the predetermined distance from the target lane keeping traveling path 205 during the normal control. In FIG. 5 and FIG. 6, reference symbol Ma represents a position of the vehicle at this time. FIG. 5 illustrates the case of the leftward steering direction (toward the road shoulder). FIG. 6 illustrates the case of the rightward steering direction (toward the road center). Then, the process proceeds to Step S18.

In Step S18, the traveling control unit 24 checks whether the avoidance target presumed to have caused the driver's steering is no longer present by referring to information from, for example, the surrounding situation information acquisition device (camera unit 21 and radar device 23). The processes of Steps S17 and S18 are repeated while keeping the current traveling path until the avoidance target is no longer present. When the avoidance target is no longer present, the process proceeds to Step S19.

In Step S19, the traveling control unit 24 returns the vehicle M to the target lane keeping traveling path 205 set at the center of the lane during the normal control, and continues the traveling control along the target lane keeping traveling path 205. Then, the process returns to Step S11.

According to the embodiment described above, when the vehicle M including the vehicle drive assist apparatus 1 that can execute at least the lane keeping traveling control for causing the vehicle M to travel along the traveling lane (lane 201) and the lane departure prevention control for suppressing departure of the vehicle M from the traveling lane (lane 201) is traveling along the ordinary road having no three-dimensional structure such as a median strip while executing the lane keeping traveling control, determination is made that the vehicle M is likely to depart from the lane 201, and the steering torque is detected, the vehicle drive assist apparatus 1 checks whether either one of the steering torque amount and the steering angle related to the detected steering torque is larger than the predetermined threshold.

When either one of the steering torque amount and the steering angle is larger than the predetermined threshold, the predetermined target lane departure prevention traveling path is created based on either one of the steering torque amount and the steering angle. When either one of the steering torque amount and the steering angle is not larger than the predetermined threshold, the new target lane keeping traveling path is created based on either one of the steering torque amount and the steering angle.

When the steering torque including the first steering torque is detected multiple times before an elapse of the predetermined period from the timing of detection of the first steering torque, the traveling control is performed along either one of the predetermined target lane departure prevention traveling path and the new target lane keeping traveling path. The traveling control is continued until the avoidance target having caused the driver's steering is no longer present. When the avoidance target is no longer present afterwards, the traveling control is performed to return to the target lane keeping traveling path at the center of the lane.

In the drive assist apparatus 1 of this embodiment, when the driver is aware of the avoidance target such as an oncoming vehicle or a side wall and steers the vehicle away from the avoidance target to change the traveling path, the steering torque is detected and either one of the target lane keeping traveling path and the target lane departure prevention traveling path is newly created based on the detected steering torque. When the driver's intended steering is detected continuously, the traveling control is performed along either one of the new target lane keeping traveling path and the new target lane departure prevention traveling path. When it is presumed that the avoidance target having caused the driver's steering is no longer present, the traveling control is performed to return the vehicle to the target lane keeping traveling path at the center of the lane during the normal control.

Therefore, it is possible to suppress immediate execution of either one of the lane keeping traveling control and the lane departure prevention control against the driver's intention. When the driver's intended steering is continued, the traveling control is performed as appropriate along either one of the new target lane keeping traveling path and the new target lane departure prevention traveling path as intended by the driver, thereby achieving either one of the lane keeping control and the lane departure prevention control reflecting the driver's steering intention. Thus, the driver does not feel discomfort. Depending on the surrounding situation, the normal lane keeping traveling control is resumed as appropriate, thereby achieving smooth traveling control by performing more appropriate drive assist control.

The embodiment of the disclosure is not limited to the embodiment described above, and various modifications and applications may be made without departing from the gist of the disclosure. The embodiment includes various aspects of the disclosure that may be extracted by any appropriate combination of a plurality of disclosed constituent elements. For example, some of the constituent elements in the embodiment may be omitted as long as the problems described above can be solved and the effects described above can be attained. The constituent elements of different embodiments may be combined as appropriate. The embodiment of the disclosure is limited to the appended claims but not limited to specific modes of implementation.

According to the embodiment of the disclosure, it is possible to provide the vehicle drive assist apparatus that can perform more appropriate drive assist control without driver's discomfort by smooth traveling control in response to driver's intended steering.

The traveling control unit 24 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling control unit 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle drive assist apparatus to be applied to a vehicle, the vehicle drive assist apparatus being configured to execute at least lane keeping traveling control for causing the vehicle to travel along a traveling lane and lane departure prevention control for suppressing departure of the vehicle from the traveling lane, the vehicle drive assist apparatus comprising:
a surrounding situation information acquisition device including a camera, the surrounding situation information acquisition device being configured to acquire surrounding situation information of the vehicle;
a steering torque sensor configured to detect a steering torque applied by using a steering mechanism of the vehicle;
a steering angle sensor configured to detect a steering angle and a steering direction of the vehicle; and
a traveling controller configured to:
execute traveling control involving steering assist control to control the vehicle to travel along a first target lane keeping traveling path based on information output from the surrounding situation information acquisition device, information output from the steering torque sensor, and information output from the steering angle sensor;
detect the steering torque indicating a first direction that causes the vehicle to deviate from the first target lane keeping traveling path, based on one of the information from the steering torque sensor and the information from the steering angle sensor;
upon detecting that the steering torque that causes the vehicle to deviate from the first target lane keeping traveling path, determine that the detected steering toque is greater than a reference value;
upon detecting that the detected steering torque is not greater than the reference value, create a second target lane keeping traveling path deviated from the first target lane keeping traveling path in the first direction, based on the detected steering torque, the detected steering angle, and the detected steering direction of the vehicle;
upon detecting that the detected steering torque is greater than the reference value, create a target lane departure prevention traveling path that is different from the second target lane keeping traveling path based on the detected steering torque, the detected steering angle, and the detected steering direction of the vehicle;
detect the steering torque indicating the first direction based on the one of the information output from the steering torque sensor and the information output from the steering angle sensor again within a predetermined period;
upon detecting the steering torque again within the predetermined period, set either the created second target lane keeping traveling path or the created target lane departure prevention traveling path for the lane keeping traveling control;
upon setting the created second target lane keeping traveling path, execute the traveling control along the created second target lane keeping traveling path; and
upon setting the created target lane departure prevention traveling path, execute the traveling control along the created target lane departure prevention traveling path.

2. The vehicle drive assist apparatus according to claim 1, wherein the traveling controller is configured to execute the traveling control for causing the vehicle to travel along either the second target lane keeping traveling path or the target lane departure prevention traveling path continuously for a predetermined period.

3. The vehicle drive assist apparatus according to claim 1, wherein the target lane departure prevention traveling path is set by delaying a start timing of the lane departure prevention control.

4. A vehicle drive assist apparatus to be applied to a vehicle, the vehicle drive assist apparatus being configured to execute at least lane keeping traveling control for causing the vehicle to travel along a traveling lane and lane departure prevention control for suppressing departure of the vehicle from the traveling lane, the vehicle drive assist apparatus comprising:
a surrounding situation information acquisition device including a camera or a radar sensor, the surrounding situation information acquisition device being configured to acquire surrounding situation information of the vehicle;
a steering torque sensor configured to detect a steering torque applied by using a steering mechanism of the vehicle;
a steering angle sensor configured to detect a steering angle and a steering direction of the vehicle; and
circuitry configured to:
execute traveling control involving steering assist control to control the vehicle to travel along a first target lane keeping traveling path based on information output from the surrounding situation information acquisition device, information output from the steering torque sensor, and information output from the steering angle sensor;
detect the steering torque indicating a first direction that causes the vehicle to deviate from the first target lane keeping traveling path, based on one of the information from the steering torque sensor and the information from the steering angle sensor;
upon detecting that the steering torque that causes the vehicle to deviate from the first target lane keeping traveling path, determine that the detected steering toque is greater than a reference value;

upon detecting that the detected steering torque is not greater than the reference value, create a second target lane keeping traveling path deviated from the first target lane keeping traveling path in the first direction, based on the detected steering torque, the detected steering angle, and the detected steering direction of the vehicle;

upon detecting that the detected steering torque is greater than the reference value, create a target lane departure prevention traveling path that is different from the second target lane keeping traveling path based on the detected steering torque, the detected steering angle, and the detected steering direction of the vehicle;

detect the steering torque indicating the first direction again within a predetermined period, based on the one of the information output from the steering torque sensor and the information output from the steering angle sensor;

upon detecting the steering torque again within the predetermined period, set either the created second target lane keeping traveling path or the created target lane departure prevention traveling path;

upon setting the created second target lane keeping traveling path, execute the traveling control along the created second target lane keeping traveling path; and upon setting the created target lane departure prevention traveling path, execute the traveling control along the created target lane departure prevention traveling path.

5. The vehicle drive assist apparatus according to claim 1, wherein the traveling controller is further configured to:

upon detecting that the detected steering torque is not greater than the reference value, start the lane departure prevention control along the second target lane keeping traveling path at a first timing; and upon detecting that the detected steering torque is greater than the reference value, start the lane departure prevention control along the target lane departure prevention traveling path at a second timing following the first timing.

6. The vehicle drive assist apparatus according to claim 1, wherein the traveling controller is further configured to execute the traveling control along the first target lane keeping traveling path after a predetermined time from execution of the traveling control along either the created second target lane keeping traveling path or the created target lane departure prevention traveling path.

7. The vehicle drive assist apparatus according to claim 1, wherein the traveling controller is further configured to execute the traveling control along the first target lane keeping traveling path upon not detecting the steering torque again within the predetermined period.

8. A vehicle drive assist apparatus to be applied to a vehicle, the vehicle drive assist apparatus being configured to execute at least lane keeping traveling control for causing the vehicle to travel along a traveling lane and lane departure prevention control for suppressing departure of the vehicle from the traveling lane, the vehicle drive assist apparatus comprising:

a surrounding situation information acquisition device including a camera and configured to acquire surrounding situation information of the vehicle;

a steering torque sensor configured to detect a steering torque applied using a steering mechanism of the vehicle;

a steering angle sensor configured to detect a steering angle and a steering direction of the vehicle; and a traveling controller configured to:

execute a first traveling control involving steering assist control to control the vehicle such that a current traveling path of the vehicle follows a first target traveling path within the traveling lane, based on information from the surrounding situation information acquisition device, information from the steering torque sensor, and information from the steering angle sensor;

determine whether the current traveling path deviates from the first target traveling path in a first direction during execution of the first traveling control;

in response to determining that the current traveling path deviates from the first target traveling path in the first direction, determine whether a first steering torque indicating the first direction is detected;

in response to determining that the first steering torque is not detected, execute a second traveling control to travel the vehicle along a second target traveling path and then travel along the first target traveling path, wherein the second target traveling path includes (i) a first shifted path following a line that shifts an edge of the traveling lane in the first direction by a first distance and in a second direction opposite to the first direction, and (ii) a first transition path connecting the current traveling path of the vehicle and the first shifted path;

in response to determining that the first steering torque is detected, (i) determine whether the first steering torque is greater than a predetermined threshold, and (ii) determine whether a second steering torque indicating the first direction is detected within a predetermined period, the second steering torque being greater than the predetermined threshold;

in response to (i) determining that the first steering torque is greater than the predetermined threshold, and (ii) determining that the second steering torque is detected, execute a third traveling control to travel the vehicle along a third target traveling path, wherein the third target traveling path includes (i) the first shifted path and (ii) a second transition path connecting the current traveling path of the vehicle and the first shifted path, wherein a start point of the second transition path is set on the first direction side relative to a start point of the first transition path; and in response to (i) determining that the first steering torque is not greater than the predetermined threshold, and (ii) determining that the second steering torque is detected, execute a fourth traveling control to travel the vehicle along a fourth target traveling path, wherein the fourth target traveling path obtained by shifting the first target traveling path by a second distance in the first direction.

9. The vehicle drive assist apparatus according to claim 8, wherein the traveling controller is further configured to: determine, based on the surrounding situation information, whether an oncoming vehicle in an oncoming lane is detected in front of the vehicle after an execution of the fourth traveling control is started, the oncoming lane being located in the second direction with respect to the traveling lane; in response to determining that the oncoming vehicle is detected, maintain the execution of the fourth traveling control; and in response to determining that the oncoming vehicle is not detected, terminate the execution of the fourth traveling control and execute the first traveling control.

* * * * *